(12) United States Patent
Fushman et al.

(10) Patent No.: US 8,612,470 B1
(45) Date of Patent: Dec. 17, 2013

(54) APPLICATION RECOMMENDATION USING STORED FILES

(71) Applicant: Dropbox, Inc., San Francisco, CA (US)

(72) Inventors: Ilya Fushman, San Francisco, CA (US); Thomas Carriero, San Francisco, CA (US); Francois Alexander Allain, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 13/730,268

(22) Filed: Dec. 28, 2012

(51) Int. Cl.
G06F 7/00 (2006.01)
G06F 17/30 (2006.01)

(52) U.S. Cl.
USPC .......................................... 707/767; 707/749

(58) Field of Classification Search
USPC ......... 707/687, 692, 694, 758, 802, 723, 732, 707/735, 748, 749, 767; 708/805; 705/26.63, 27.2, 14, 27, 29, 67
See application file for complete search history.

(56) References Cited

U.S. PATENT DOCUMENTS

| 8,041,672 | B2 * | 10/2011 | Ogawa et al. | 707/609 |
| 8,468,164 | B1 * | 6/2013 | Paleja et al. | 707/767 |
| 2006/0059174 | A1 * | 3/2006 | Mese et al. | 707/100 |
| 2010/0017426 | A1 * | 1/2010 | Marston | 707/102 |
| 2010/0070707 | A1 * | 3/2010 | Nishimura | 711/115 |
| 2010/0161441 | A1 * | 6/2010 | Hounsell | 705/26 |
| 2010/0211575 | A1 * | 8/2010 | Collins et al. | 707/749 |
| 2010/0250337 | A1 * | 9/2010 | Kassaei | 705/10 |
| 2012/0303477 | A1 * | 11/2012 | Ben-Itzhak | 705/26.7 |
| 2013/0132896 | A1 * | 5/2013 | Lee et al. | 715/808 |
| 2013/0138674 | A1 * | 5/2013 | Jeong et al. | 707/758 |
| 2013/0173637 | A1 * | 7/2013 | Kim et al. | 707/748 |
| 2013/0185292 | A1 * | 7/2013 | Li et al. | 707/723 |

* cited by examiner

*Primary Examiner* — Md. I Uddin

(74) *Attorney, Agent, or Firm* — Novak Druce Connolly Bove + Quigg LLP

(57) ABSTRACT

The disclosed technology can enable files to be stored with a networked environment. The files can be associated with information (e.g., properties) such as a file name, a file type, a date/time at which a respective file was last accessed, a number of times a respective file was accessed, data representing the contents of a respective file, and other information. Based at least in part on analyzing the information, the disclosed technology can select or identify a file and/or a file property (e.g., a file type) that the disclosed technology predicts to be most relevant to the user. The disclosed technology can then recommend applications based at least in part on the selected or identified file and/or file property (e.g., file type).

17 Claims, 12 Drawing Sheets

APPLICATION RECOMMENDATION USING STORED FILES

TECHNICAL FIELD

The present technology pertains to making recommendations to users or customers of content for the users to acquire or purchase, and more specifically pertains to recommending content items such as software applications using information associated with stored files of users. In some embodiments the technology is applied to a shared and synchronized content management system having a plurality of user accounts for storing content such as files remotely at a central location such as the Cloud or Internet.

BACKGROUND

Software applications (also known as simply "applications" or "apps") are becoming ubiquitous in all aspects of modern life. People use applications on their computing devices every day as mobile applications are growing in number and in function. For example, some users have applications to add photographic effects to the pictures they take. Some users have mobile apps to write, edit, and view documents while traveling on business. Other apps allow multiple users to communicate with one another. There are also gaming apps for users who like to play computer games on their computing devices. In fact, many computing device platforms have application marketplaces that provide applications for a wide variety of purposes. Users can access the application marketplaces to download, install, and use various apps.

With the increasingly large number of app choices, it can be difficult to determine which apps may be relevant and of interest to a particular user. In some cases, even the user may not know which apps are relevant or of interest to him/her. Determining which apps to present to the user can often be an inaccurate or imprecise task. Presenting apps of little or no interest to the user can be inefficient in terms of utilizing computing resources and can also reduce the overall satisfaction of the user experience associated with acquiring and using apps.

SUMMARY

Features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out hereinafter. These and other features of the disclosure will become more fully apparent from the following description and accompanying drawings, or can be learned by the practice of the principles set forth herein.

Disclosed are systems, methods, and non-transitory computer-readable storage media for application recommendation using files stored with a networked storage environment. Various embodiments of the present disclosure enable files to be stored with the networked environment. The files can be associated with a user of the networked environment. For example, the user can create an account with the networked environment, log into his/her account using a computing device, and upload files to be stored with the networked environment under his/her account. The files stored on the networked environment can be synced with any computing device that is logged into the user's account, independent of the platform (e.g., operating system) of the computing device. The syncing of the stored files can also enable any modification to the files made with one device to be reflected on other devices when the other devices access the files. Moreover, the user can also access files shared by another user(s).

Each of the stored files can be associated with information (e.g., file properties) such as a file name, a file type (i.e., a file format), a date and time the respective file was last accessed (e.g., uploaded, modified, opened, etc.), a number of times the respective file was accessed, data representing contents of the respective file, etc. In some embodiments, systems, methods, and non-transitory computer-readable storage media of the present disclosure can analyze the information associated with the stored files to predict which of the stored files is most relevant (i.e., is of the highest interest) and/or most likely to be relevant to the user. For example, a system consistent with the present disclosure can be configured to assume that the last (i.e., most recently) accessed file is most likely to be relevant to the user. In another example, the system can decide that the file that has been accessed the most number of times is likely to be the most relevant to the user. In each of these examples, the system can identify or select the most relevant file(s) and make recommendations to the user for applications based on information associate with the identified/selected file(s). For example, if the system identifies or selects an image file as being relevant to the user, then the system can recommend applications to the user that are related to images, such as image editing apps.

In some embodiments, the information associated with the user's stored files can be analyzed in attempt to predict which file property(ies) (e.g., file type(s)) associated with the stored files, are most relevant to the user. For example, the system can decide that the most common file type among the stored files is likely to be the most relevant (and/or most likely to be relevant) to the user. In one example, if 90% of the files stored with an account of a user are MP3 files, then the system can predict that the MP3 file type is the most relevant to the user. The system can identify or select the MP3 file type as the file type for which applications are to be recommended. As such, in this example, the system can recommend MP3 playing apps, MP3 editing apps, and other apps relating to the MP3 file type.

In other embodiments, information pertaining to the composition or profile of stored files of user accounts can be associated with the applications that prior users have chosen to acquire and stored in a database. Consequently, a stored file profile can be generated for a particular user and compared with similar profiles in the database to obtain application recommendations to send to the user.

Accordingly, various embodiments of the present disclosure can use stored files (i.e., including information associated with the stored files) to determine which applications to recommend to particular users.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore limiting of its scope, the principles herein are described and explained with additional specificity and detail through the use of the accompanying drawings in which.

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for application recommendation using files stored with a networked environment. The disclosed technology can enable files to be stored with the networked environment. The files can be associated with information (e.g., properties) such as a file name, a file type, a date/time at which a respective file was last accessed, a number of times a respective file was accessed, data representing the contents of a respective file, and other information. Based at least in part on analyzing the information, the disclosed technology can select or identify a file and/or a file property (e.g., a file type) that the disclosed technology predicts to be most relevant to the user. The disclosed technology can then recommend applications based at least in part on the selected or identified file and/or file property (e.g., file type).

Figure 1:
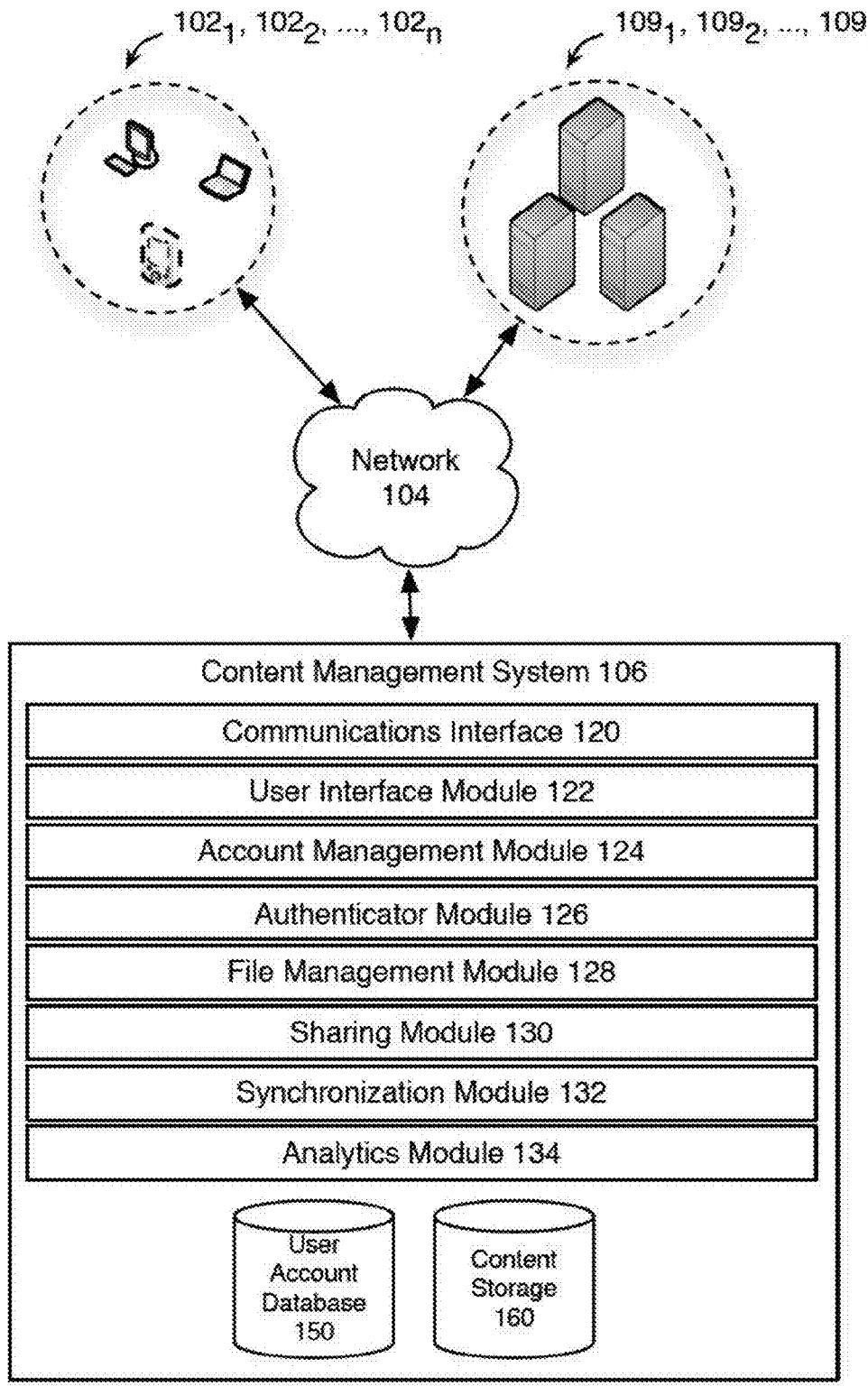
FIG. 1 shows an exemplary configuration of devices and a network in accordance with the invention.

An exemplary system configuration 100 is shown in FIG. 1, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, a user can interact with content management system 106 through client devices $102_1, 102_2, \ldots, 102_n$ (collectively "102") connected to network 104 by direct and/or indirect communication. Content management system 106 can support connections from a variety of different client devices, such as: desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device $102_i$. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device $102_i$ and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can make it possible for a user to store content, as well as perform a variety of content management tasks, such as retrieve, modify, browse, and/or share the content. Furthermore, content management system 106 can make it possible for a user to access the content from multiple client devices 102. For example, client device $102_i$ can upload content to content management system 106 via network 104. The content can later be retrieved from content management system 106 using the same client device $102_i$ or some other client device $102_j$.

To facilitate the various content management services, a user can create an account with content management system 106. The account information can be maintained in user account database 150. User account database 150 can store profile information for registered users. In some cases, the only personal information in the user profile can be a username and/or email address. However, content management system 106 can also be configured to accept additional user information.

User account database 150 can also include account management information, such as account type, e.g. free or paid; usage information, e.g. file edit history; maximum storage space authorized; storage space used; content storage locations; security settings; personal configuration settings; content sharing data; etc. Account management module 124 can be configured to update and/or obtain user account details in user account database 150. The account management module 124 can be configured to interact with any number of other modules in content management system 106.

An account can be used to store content, such as documents, text files, audio files, video files, etc., from one or more client devices 102 authorized on the account. The content can also include folders of various types with different behaviors, or other mechanisms of grouping content items together. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

The content can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where the content items are being stored by content management system 106. In one variation, content management system 106 can store the content items in the same folder hierarchy as they appear on client device $102_i$. However, content management system 106 can store the content items in its own order, arrangement, or hierarchy. Content management system 106 can store the content items in a network accessible storage (SAN) device, in a redundant array of inexpensive disks (RAID), etc. Content storage 160 can store content items using one or more partition types, such as FAT, FAT32, NTFS, EXT2, EXT3, EXT4, ReiserFS, BTRFS, and so forth.

Content storage 160 can also store metadata describing content items, content item types, and the relationship of content items to various accounts, folders, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate files or duplicate segments of files. Instead of storing multiple copies, content storage 160 can store a single copy and then use a pointer or other mechanism to link the duplicates to the single copy. Similarly, content storage 160 can store files more efficiently, as well as provide the ability to undo operations, by using a file version control that tracks changes to files, different versions of files (including diverging version trees), and a change history. The change history can include a set of changes that, when applied to the original file version, produce the changed file version.

Content management system 106 can be configured to support automatic synchronization of content from one or more client devices 102. The synchronization can be platform agnostic. That is, the content can be synchronized across multiple client devices 102 of varying type, capabilities, operating systems, etc. For example, client device $102_i$ can include client software, which synchronizes, via a synchronization module 132 at content management system 106, content in client device $102_i$'s file system with the content in an associated user account. In some cases, the client software can synchronize any changes to content in a designated folder and its sub-folders, such as new, deleted, modified, copied, or moved files or folders. The client software can be a separate software application, can integrate with an existing content management application in the operating system, or some combination thereof. In one example of client software that integrates with an existing content management application, a user can manipulate content directly in a local folder, while a background process monitors the local folder for changes and synchronizes those changes to content management system 106. Conversely, the background process can identify content that has been updated at content management system 106 and synchronize those changes to the local folder. The client software can provide notifications of synchronization operations, and can provide indications of content statuses directly within the content management application. Sometimes client device $102_i$ may not have a network connection available. In this scenario, the client software can monitor the linked folder for file changes and queue those changes for later synchronization to content management system 106 when a network connection is available. Similarly, a user can manually stop or pause synchronization with content management system 106.

A user can also view or manipulate content via a web interface generated and served by user interface module 122. For example, the user can navigate in a web browser to a web address provided by content management system 106. Changes or updates to content in the content storage 160 made through the web interface, such as uploading a new version of a file, can be propagated back to other client devices 102 associated with the user's account. For example, multiple client devices 102, each with their own client software, can be associated with a single account and files in the account can be synchronized between each of the multiple client devices 102.

Content management system 106 can include a communications interface 120 for interfacing with various client devices 102, and can interact with other content and/or service providers $109_1$, $109_2$, . . . , $109_n$ (collectively "109") via an Application Programming Interface (API). Certain software applications can access content storage 160 via an API on behalf of a user. For example, a software package, such as an app on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access files. Further, content management system 106 can include analytics module 134 module that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some embodiments, content management system 106 can be configured to maintain a content directory identifying the location of each content item in content storage 160. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

A content entry can also include a content pointer that identifies the location of the content item in content storage 160. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 130 can be configured to add a user account identifier to the content entry associated with the content item, thus granting the added user account access to the content item. Sharing module 130 can also be configured to remove user account identifiers from a content entry to restrict a user account's access to the content item.

To share content publicly, sharing module 130 can be configured to generate a custom network address, such as a uniform resource locator (URL), which allows any web browser to access the content in content management system 106 without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 130 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 130 can be configured to change the value of the flag to 1 or true after generating a URL to the content item.

In some embodiments, sharing module 130 can also be configured to deactivate a generated URL. For example, each content entry can also include a URL active flag indicating whether the content should be returned in response to a request from the generated URL. For example, sharing module 130 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 130 can reactivate the URL by again changing the value of the URL active flag to 1 or true. A user can thus easily restore access to the content item without the need to generate a new URL.

While content management system 106 is presented with specific components, it should be understood by one skilled in the art, that the architectural configuration of system 106 is simply one possible configuration and that other configurations with more or less components are also possible.

Figure 2:
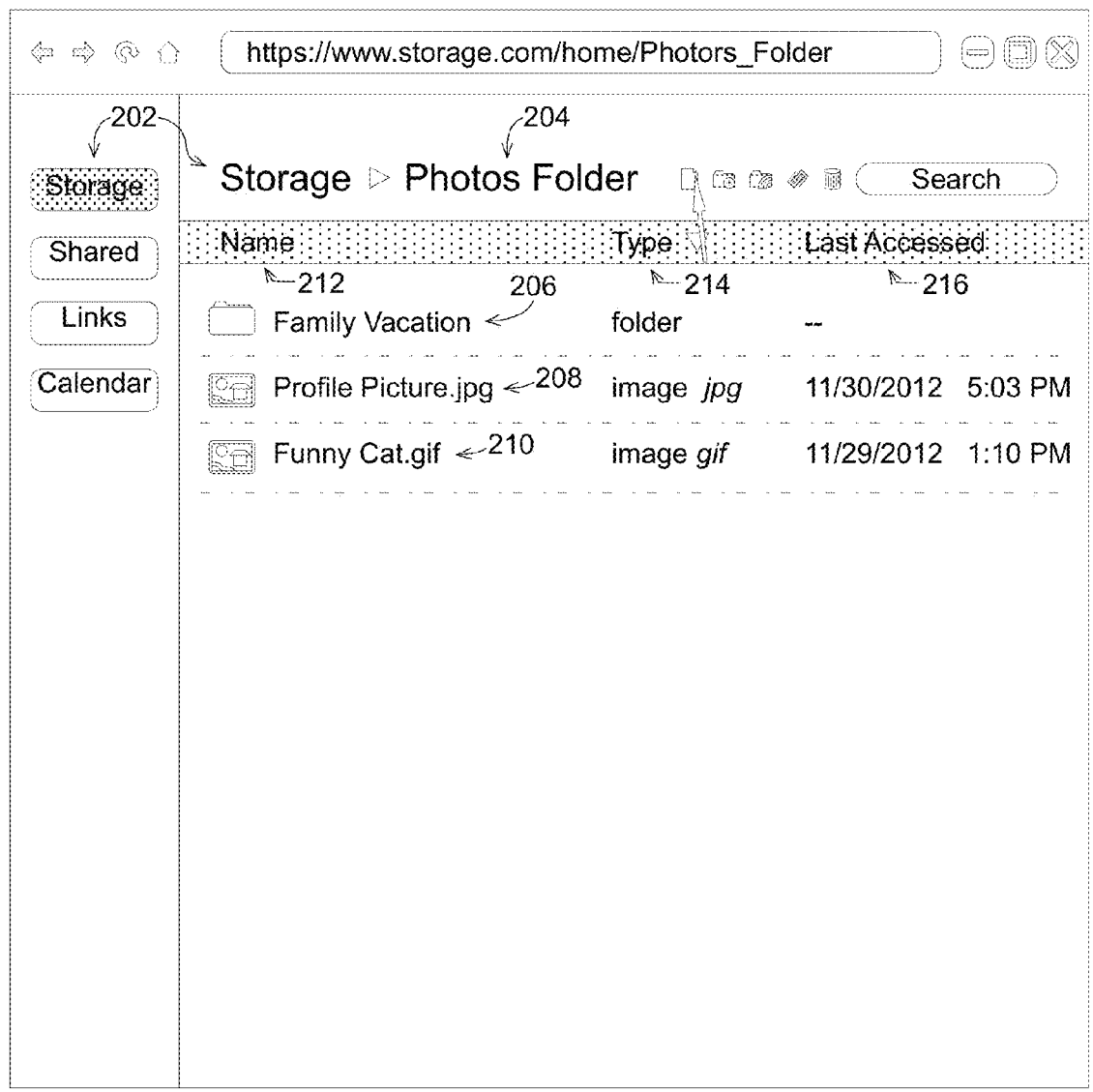
FIG. 2 shows an exemplary webpage for storing files in a networked environment.

With reference now to FIG. 2, an exemplary webpage for storing files in a networked environment such as a shared content management system is shown. The exemplary webpage can provide folders and/or directories in which to store files (e.g., data). For example, a user of a computing device can access the content management system using the computing device and create an account with the content management system. Using the computing device, the user of the content management system can upload and/or save files in the content management system under his/her account. The files stored in the content management system can be synced with the user's account such that the files can be accessed from any device logged into the user's account, independent of the platform (e.g., operating system) of the device. The files can be synced such that when there is a modification and/or update to a file from one device, the modified/updated file can be updated to copies of files stored on other devices as well.

The user's account can have a root directory, such as Storage 202, for storing files in the networked environment. There can also be subfolders and/or subdirectories under the root directory. For example, the user of the networked environment can create a folder called "Photos Folder" 204 as a subdirectory of Storage 202. In this example, the user can have created Photos Folder 204 with the intention for Photos Folder 204 to store the user's photographs. Within Photos Folder 204, there can be another subfolder called "Family Vacation" 206. In this example, the user can have created Family Vacation 206 with the intention for Family Vacation 206 to store photographs related to a family trip of the user.

In the example of FIG. 2, Photos Folder 204 can include files, such as Profile Picture.jpg 208 and Funny Cat.gif 210, which can be images that have been uploaded and stored in Photos Folder 204. Each of the files can be associated with information including (but not limited to) name 212, file type (i.e., file format) 21, and date/time at which the file was most recently accessed 216 (e.g., when the file was uploaded, when the file was shared, when the file was opened/viewed/previewed, when the file was selected/clicked-on, when the file was modified, etc.). Name 212, file type 214, and last accessed date/time 216 shown in FIG. 2 are for illustrative purposes only and are not always required. Although not shown in FIG. 2, each of the files can also be associated with other information such as a file size, an author, a number of times a file has been accessed, a number of times a file has been accessed within a specified time period, etc.

The file type for Family Vacation 206 can be a folder. The file type for Profile Picture.jpg 208 can be an image, or more specifically, a JPG image. For Funny Cat.gif 210, the file type can be an image, or more specifically, a GIF image. Moreover, information associated with Profile Picture.jpg 208 can show that Profile Picture.jpg 208 was last accessed (e.g., saved, uploaded, created, opened, shared, modified, etc.) 216 on Nov. 30, 2012 at 5:03 PM. Also, Funny Cat.gif 210 can be associated with information that specifies that Funny Cat.gif 210 was most recently accessed 216 on Nov. 29, 2012 at 1:10 PM.

In some embodiments, systems, methods, and non-transitory computer-readable storage media in accordance with the present disclosure can analyze information associated with the files stored in the content management system to select (or identify) a file. In some embodiments, the selection (or identification) of the file can be based on selection criteria (or identification criteria) that attempt to predict which of the stored files is most relevant to the user (i.e., which of the files is probably the most relevant to the user as of now). For example, the information associated with the files can be analyzed in attempt to determine a file that has a highest likelihood of being most relevant to the user (as of the present time). Accordingly, the selection criteria can be configured to take into account the information associated with the files stored.

In some embodiments, systems, methods, and/or non-transitory computer-readable storage medium of the present disclosure can assume that the most recently accessed file is likely to be most relevant to the user. Accordingly, the selection of the file can be based on the last accessed information associated with the files. In other words, the file that is selected can be the file that was most recently accessed as compared to the other files.

In some embodiments, the file that has been accessed the most can be assumed to be most relevant to the user. In one example, the file that is selected can be the file that has the highest number of times of being accessed. In another example, the file that is selected can be the file with the most number of times being accessed within a specified time period (e.g., last hour, last 24 hours, last week, last month, etc.).

Furthermore, in some embodiments, systems, methods, and/or non-transitory computer-readable storage medium of the present disclosure can assume that files associated with a most commonly occurring particular file type are most relevant to the user. As such, the particular file type can be selected instead of or in addition to selecting a particular file. In some embodiments, the most common file type that is associated with the files stored in the user's account can be selected. In one example, if the user uses his/her account with the content management system to primarily store images, then the majority of his/her files stored on the content management system will likely be images. If so, the image file type can be selected.

In another example, it can be assumed that the most common file type, among a set of files that have been accessed within a specified time period (e.g., within the last hour, within the last 24 hours, within the last week, etc.), is the most relevant. For example, if there were 100 files stored in the user's account and 10 of the files were accessed within a specified time period (e.g., within the last 24 hours), then the most common file type associated with those 10 files will be selected. If four files were images, three files were text documents, and three files were slideshow documents, then the image file type is the most common file type and can be selected.

Based on the selected (or identified) file and/or file type, the systems, methods, and/or non-transitory computer-readable storage medium can determine which application(s) to suggest to the user. For example, if the most relevant file(s) and/or file type(s) relate to images, then photography editing applications can be recommended to the user. If the most relevant file(s) and/or file type(s) relate to word processing documents, then word processing applications can be recommended.

Figure 3:
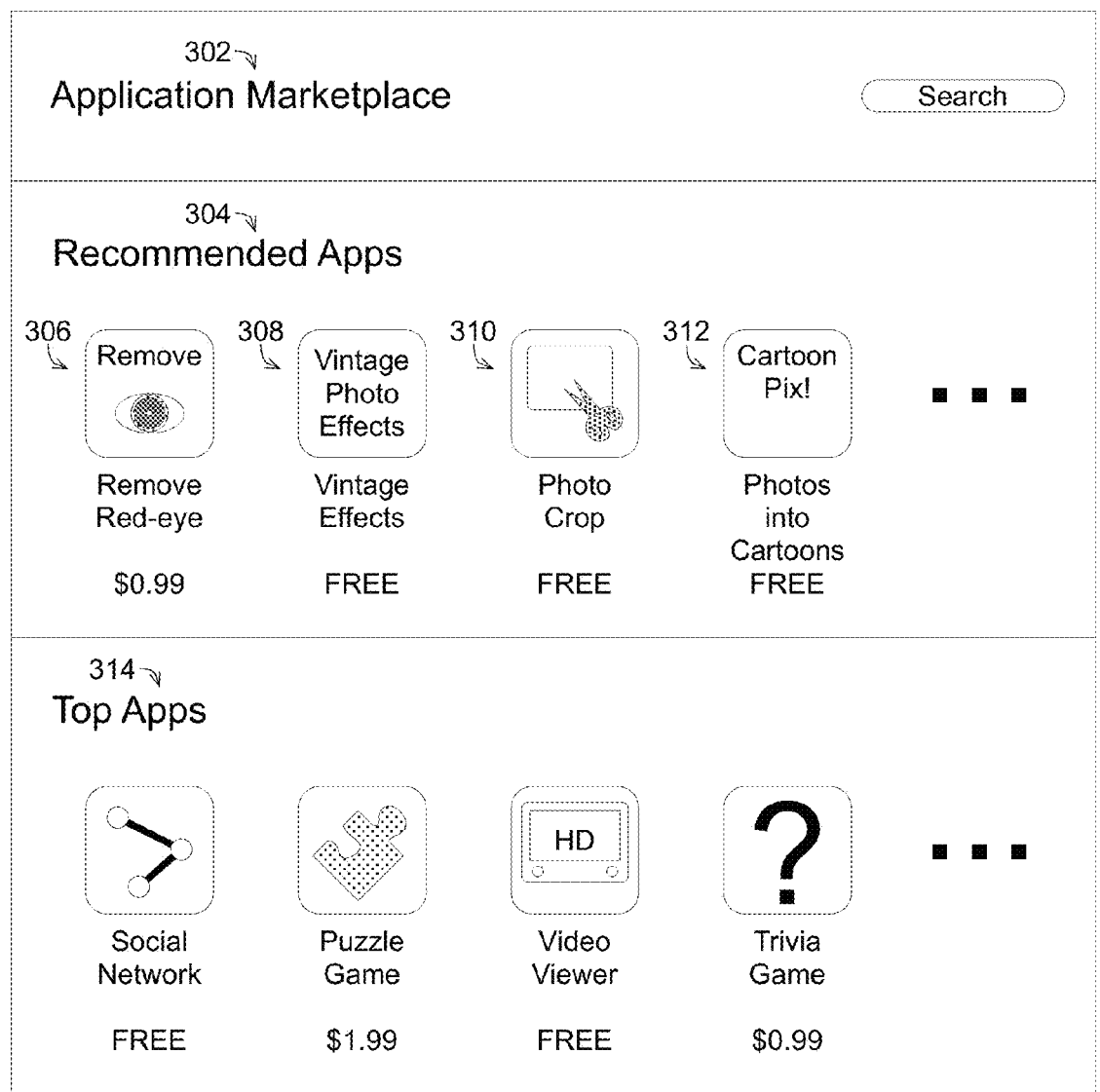
FIG. 3 shows an exemplary interface for application recommendation using files stored in a networked environment.

FIG. 3 shows an exemplary interface for application recommendation using files stored in a networked environment such as a content management system. In some embodiments, the interface can be associated with electronic application marketplace 302. Application marketplace 302 can provide applications which can be purchased or used for free. In some embodiments, application marketplace 302 can communicate with the content management system to present and provide access to various applications (i.e., apps) to the user of the content management system. In some embodiments, application marketplace 302 can work with a wide variety of computing devices on various platforms. Accordingly, application marketplace 302 can present and provide applications that are suitable for the device(s) used by the user.

In some embodiments, the applications provided by application marketplace 302 can be created by application developers. Each application can also be associated with information, such as an application category, an application type, file compatibility, etc. The information associated with each application can be provided by the application developer/publisher or can be obtained by application marketplace 302 during an analysis and/or review process of a respective application.

As shown in the example of FIG. 3, application marketplace 302 can present and provide access to recommended applications 304. As previously discussed, systems, methods, and/or non-transitory computer-readable storage medium of the present disclosure determine which applications to recommend. Systems, methods, and/or non-transitory computer-readable storage medium can make recommendations for apps based at least in part on the file(s) and/or file type(s) that have been selected (or identified) as being most likely to be relevant to the user. For example, if the selection (or identification) criterion is based on the last accessed file, then Profile Picture.jpg 208 (see FIG. 2) can be selected as likely being most relevant to the user. Then applications capable of processing (e.g., opening, editing, utilizing, executing, working with, etc.) Profile Picture.jpg 208 can be recommended.

If Profile Picture.jpg 208 is selected, then applications recommended using Profile Picture.jpg 208 (i.e., using information and/or a property(ies) associated with Profile Picture.jpg 208) can include apps that relate to Profile Picture.jpg 208, such as apps that are compatible with the JPG image file type, that can edit images, that can add effects to photographs, etc. For example, recommended apps 304 can include Remove Red-eye 306, Vintage Effects 308, Photo Crop 310, Photos into Cartoons 312, and/or other apps. Moreover, in some embodiments, application marketplace 302 can also present top (most popular, best rated, etc.) applications 314 along with recommended apps 304.

Figure 4:
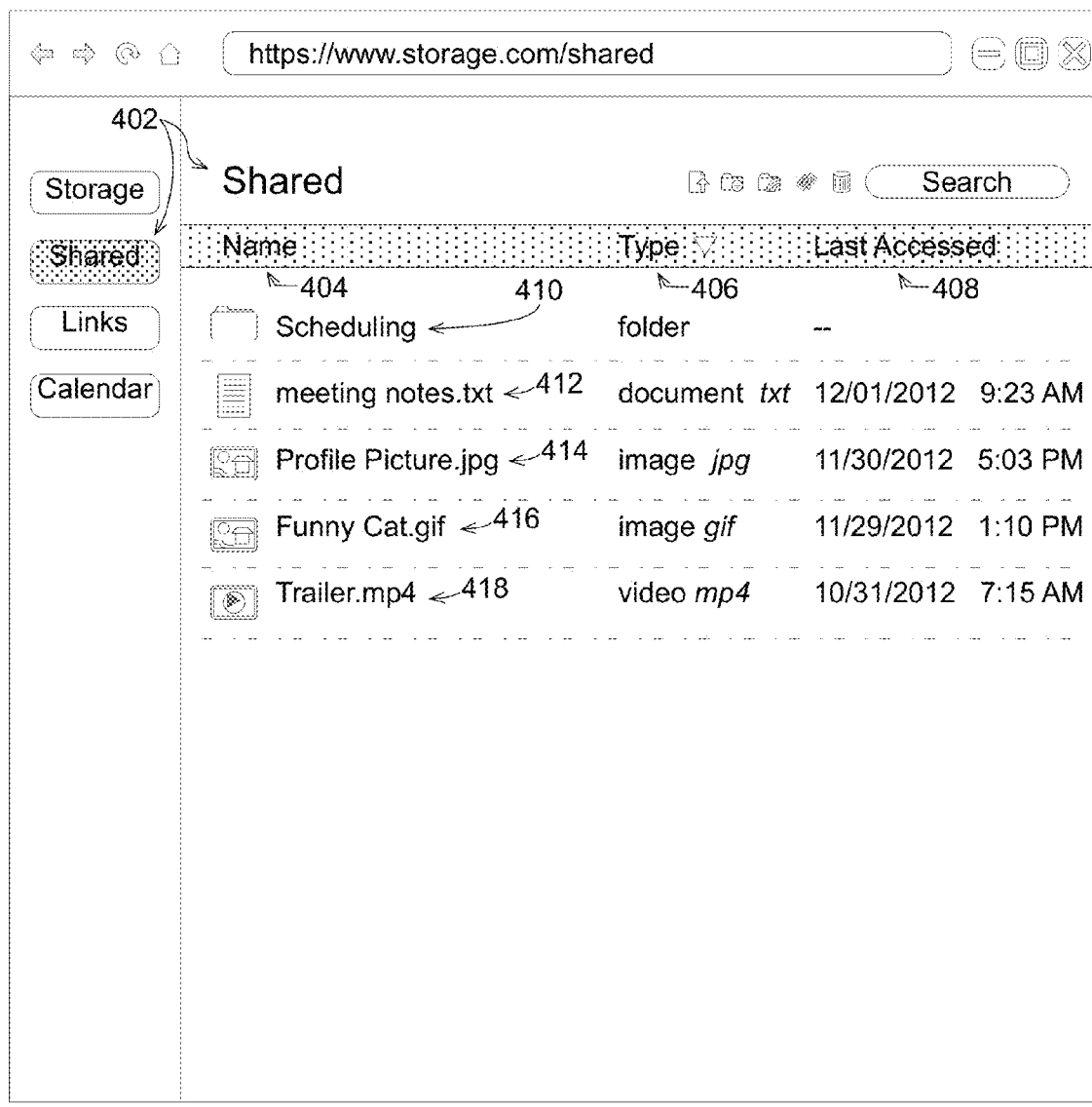
FIG. 4 shows an exemplary webpage for storing files in a networked environment.

FIG. 4 shows another exemplary webpage for storing files in a content management system. In some embodiments, the exemplary webpage can enable files to be stored and shared via the content management system. For example, the user of the networked environment can obtain a link from the content management system. The link can provide access to a file stored on the content management system with the user's account. To share the file, the user can share the link with another entity(ies), such as a friend, a peer, a group, etc. Using the link, the other entity(ies) can access the file stored at the user's account.

FIG. 4 shows a directory (Shared 402) of items being shared. In Shared 402, there can be items that are shared by the user with another entity(ies). The items can be associated with information such as name 404, type 406, and last accessed date and time 408. The items shared can include, for example, subdirectory/subfolder Scheduling 410. In other words, Scheduling folder 410 and the contents (e.g., files) included in Scheduling folder 410 are stored at the networked environment and shared with the other entity(ies). Further, as shown in FIG. 2, the items shared can include, for example, files such as meeting notes.txt 412, Profile Picture.jpg 414, Funny Cat.gif 416, and Trailer.mp4 418. As discussed previously, the files can be associated with information such as name 404, type 406, and when each file was last accessed 408. Meeting notes.txt 412 is a document type (e.g., TXT type); Profile Picture.jpg 414 is an image type (e.g., JPG type); Funny Cat.gif 416 is an image type (e.g., GIF type); and Trailer.mp4 418 is a video type (e.g., MP4 type).

In one example, meeting notes.txt 412 can be selected. If the selection is based on last accessed information 408, then meeting notes.txt 412 can be selected because it is the file that was most recently accessed.

In another example, a file type can be selected from the plurality of file types (e.g., document TXT type, image JPG/GIF type, video MP4 type). In this example, the file type can be selected to be the most common file type. As such, the filed type can be selected to be an image type because there are two files having the image type, one file having a document type, and one file having a video type. Thus, the image type is the most common among the stored files.

In a further example, a file type can be selected from a subset of the plurality of file types where the subset includes file types that are associated with files that have been accessed within a specified time period. For this example, the current date can be Dec. 2, 2012 and the specified time period can be within the past week, such that only Meeting notes.txt 412, Profile Picture.jpg 414, and Funny Cat.gif 416 are files that have been accessed within the specified time period. As such, the subset of file types includes one document instance and two image instances. Thus, the image file type can be the selected file type.

In some embodiments, a combination of a file(s) and a file type(s) can be selected. This can increase the number of applications to be recommended and can increase the possibility that a recommended application will be relevant to the user. Assuming, for example, that meeting notes.txt 412 and the image file type have been selected, then applications can be recommended for meeting notes.txt 412 and for the image file type, as shown in FIG. 5.

Figure 5:
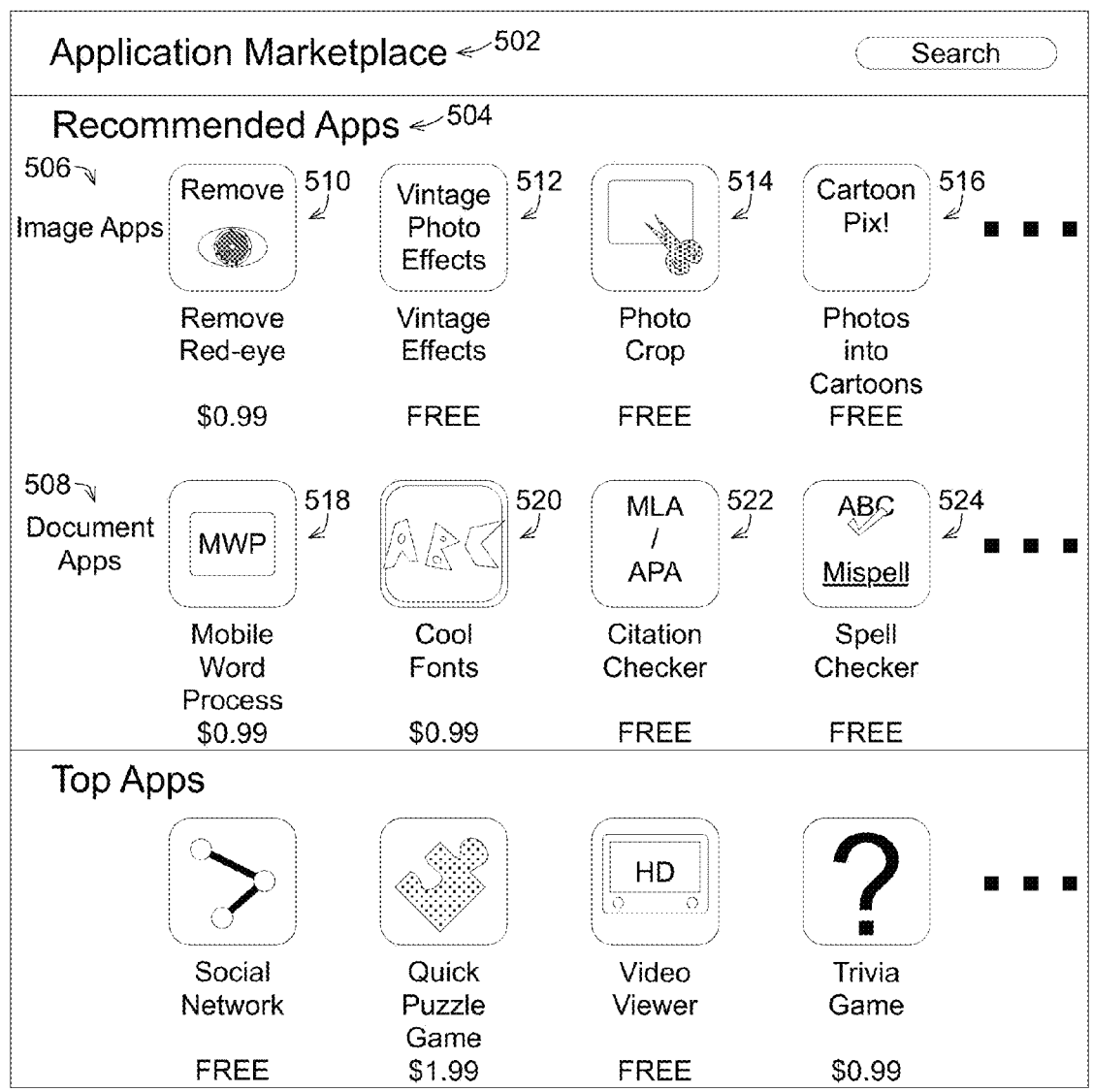
FIG. 5 shows an exemplary interface for application recommendation using files stored in a networked environment.

FIG. 5 shows another exemplary interface for application recommendation using files stored in a content management system. The exemplary interface can be associated with application marketplace 502. Application marketplace 502 can present and provide access to applications. In particular, application marketplace 502 can present and provide access to applications that have been recommended based at least in part on stored files (i.e., recommended based at least in part on information about the stored files).

Assuming that meeting notes.txt 412 and the image file type (see FIG. 4) have been selected, applications can be recommended based on the selection of meeting notes.txt 412 and the image file type. Accordingly, recommended apps 504 can include, for example, image apps 506 and document apps 508, which are related to meeting notes.txt 412 and the image file type, respectively.

In some embodiments, recommended apps 504 can include apps that are configured to process (e.g., open, view, edit, utilize, work with, etc.) meeting notes.txt 412 and the stored files that are associated with the image file type (e.g., Profile Picture.jpg 414 and Funny Cat.gif 416 in FIG. 4). As shown in FIG. 5, recommended image apps 506 can include, for example, Remove Red-eye 510, Vintage Effects 512, Photo Crop 514, and Photos into Cartoons 516. In some embodiments, recommended image apps 506 must be able to process image types including the JPG type as well as the GIF type because Profile Picture.jpg 414 is of the JPG type and Funny Cat.gif 416 is of the GIF type. Moreover, recommended document apps 508 can include, for example, Mobile Word Processing 518, Cool Fonts 520, Citation Checker 522, and Spell Checker 524.

According to an alternate embodiment, the recommended apps 504 presented can be determined by comparing a profile of the files stored in the user's account in the content management system, with a database of apps that were most commonly selected by other users having similar stored file profiles. For example, users having stored files relating to certain text and mp4 types/names/sizes, etc. may have commonly selected an application relating to a particular game, etc.

Figure 6:
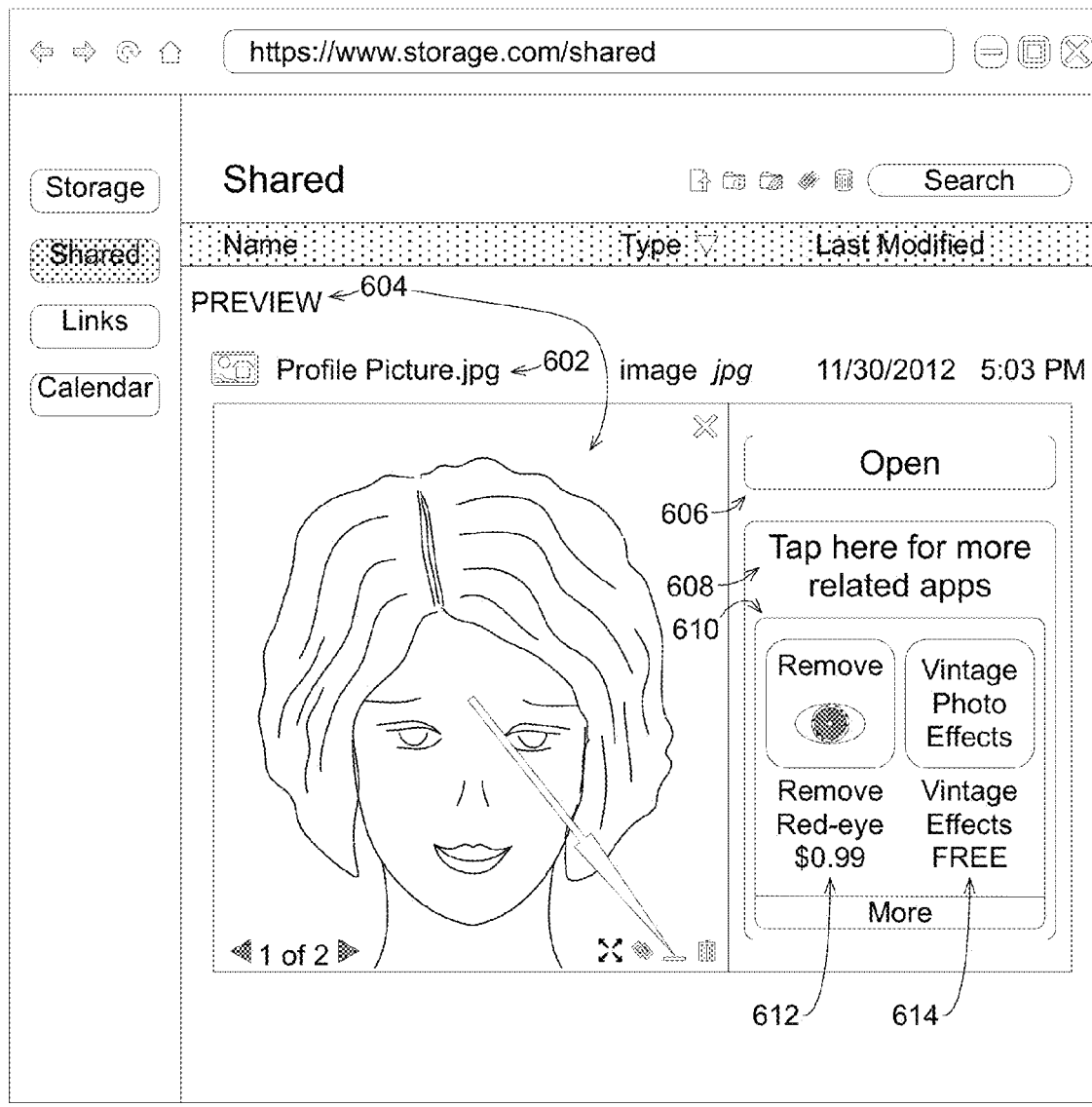
FIG. 6 shows an exemplary webpage for providing access to applications recommended using files stored in a networked environment.

FIG. 6 shows an exemplary webpage for providing access to recommended applications using files stored in a content management system. As shown in FIG. 6, the webpage can present and provide recommended applications. In some embodiments, when the user interacts with (e.g., selects, clicks on, etc.) a file stored in the content management system, the file can be selected/identified (e.g., as being likely to be most relevant to the user). Then applications can be recommended for the file using information associated with the selected file (e.g., file type, content, etc.). Access to the recommended apps can also be provided.

For example, as shown in FIG. 6, the user can click on a stored file, such as Profile Picture.jpg 602. In this example, when the user clicks on Profile Picture.jpg file 602, Profile Picture.jpg 602 can be selected as being most relevant to the user and a preview for the file can be rendered and displayed. In some embodiments, Preview 604 can be a smaller and/or lower resolution rendering of Profile Picture.jpg file 602. As shown in FIG. 6, there can also be an option to open the full version of Profile Picture.jpg 602 via Open button 606. Further, there can be an input area (e.g., button), that when enabled/triggered, causes applications recommended based on the selection of Profile Picture.jpg 602 (and/or its file type) to be provided. For example, the user can tap on input area 608 to cause window 610 to be displayed. Window 610 can provide access to applications recommended using Profile Picture.jpg 602. In this example, because the selection was of Profile Picture.jpg 602, photo related apps such as Remove Red-eye 612 and Vintage Effects 614 can be recommended and provided.

In some embodiments, the user can interact with (e.g., select, click on, etc.) the icons provided for recommended apps Remove Red-eye 612 and Vintage Effects 614 in order to access them. For example, a download, installation, and/or execution of recommended apps can be initialized/triggered by a user interaction with the icon for the recommended apps. In another example, the user interaction with the icon for the recommended apps can cause an application marketplace to be presented, which can provide access to the recommended apps.

Figure 7A:
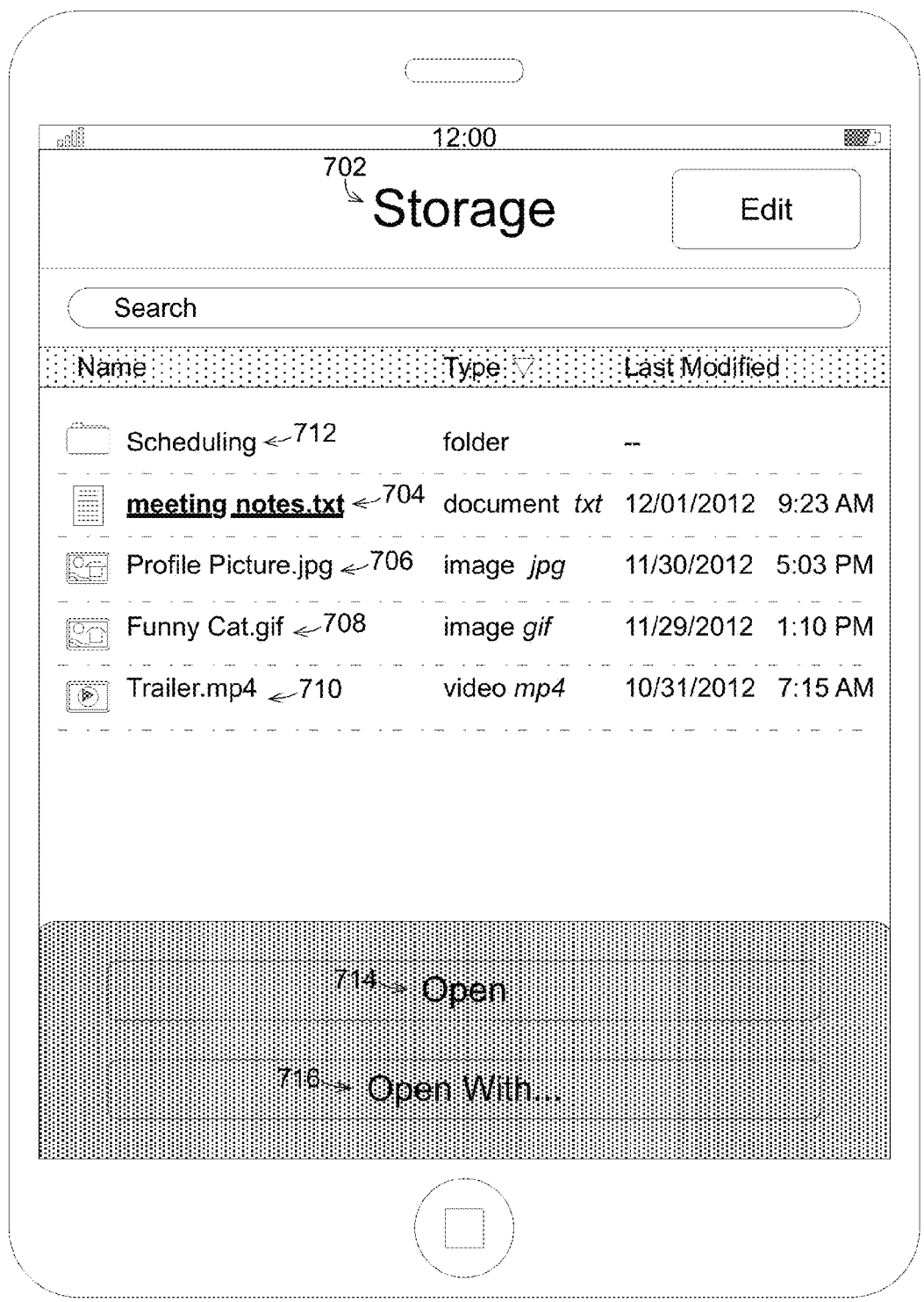
FIG. 7A shows a screenshot of an exemplary device embodiment for accessing files stored in a networked environment.

FIG. 7A shows a screenshot of an exemplary device embodiment for accessing files stored in a content management system. The exemplary computing device embodiment can allow the user to access the folders and/or directories of the content management system in which files (e.g., data) are stored. Using the exemplary computing device, the user can log into his/her account with the content management system and access (e.g., upload, modify, view, etc.) files.

As shown in FIG. 7A, the content management system can provide a root directory/folder, Storage 702. Under root directory/folder Storage 702, there can be files and subdirectories/subfolders. Examples of files stored in root folder Storage 702 can include meeting notes.txt 704, Profile Picture.jpg 706, Funny Cat.gif 708, and Trailer.mp4 710. Each of the files stored can be associated with information, such as a name, a file type, a last accessed time, and/or other information (e.g., including file content). An example of a subdirectory/subfolder can be Scheduling folder 712, which can also store files.

In one example, the user can interact with (e.g., select, click-on, tap, tap and hold, etc.) an input area for accessing meeting notes.txt 704. In some embodiments, the user interaction with respect to (the input area for accessing) meeting notes.txt 704 can cause meeting notes.txt 704 to be selected/identified. For example, because the user tapped meeting notes.txt 704, the system can decide that meeting notes.txt 704 has a high likelihood of being relevant to the user. As such, applications can be recommended using meeting notes.txt 704 (including using information associated with meeting notes.txt 704). In other words, applications can be identified based on their relatedness/relevance to meeting notes.txt 704 (and/or information associated with meeting notes.txt 704).

When the user interacts with (e.g., tap and hold) the input area for accessing meeting notes.txt 704, the computing device embodiment can present options for accessing meeting notes.txt 704. As shown in FIG. 7A, the user has the choice of opening 714 meeting notes.txt 704 (e.g., with an application that is configured as the default application for accessing meeting notes.txt 704.) or opening the file with an application chosen by the user. If the user chooses the button for Open With 716, more options for accessing meeting notes.txt 704 can be provided, as shown in FIG. 7B.

Figure 7B:
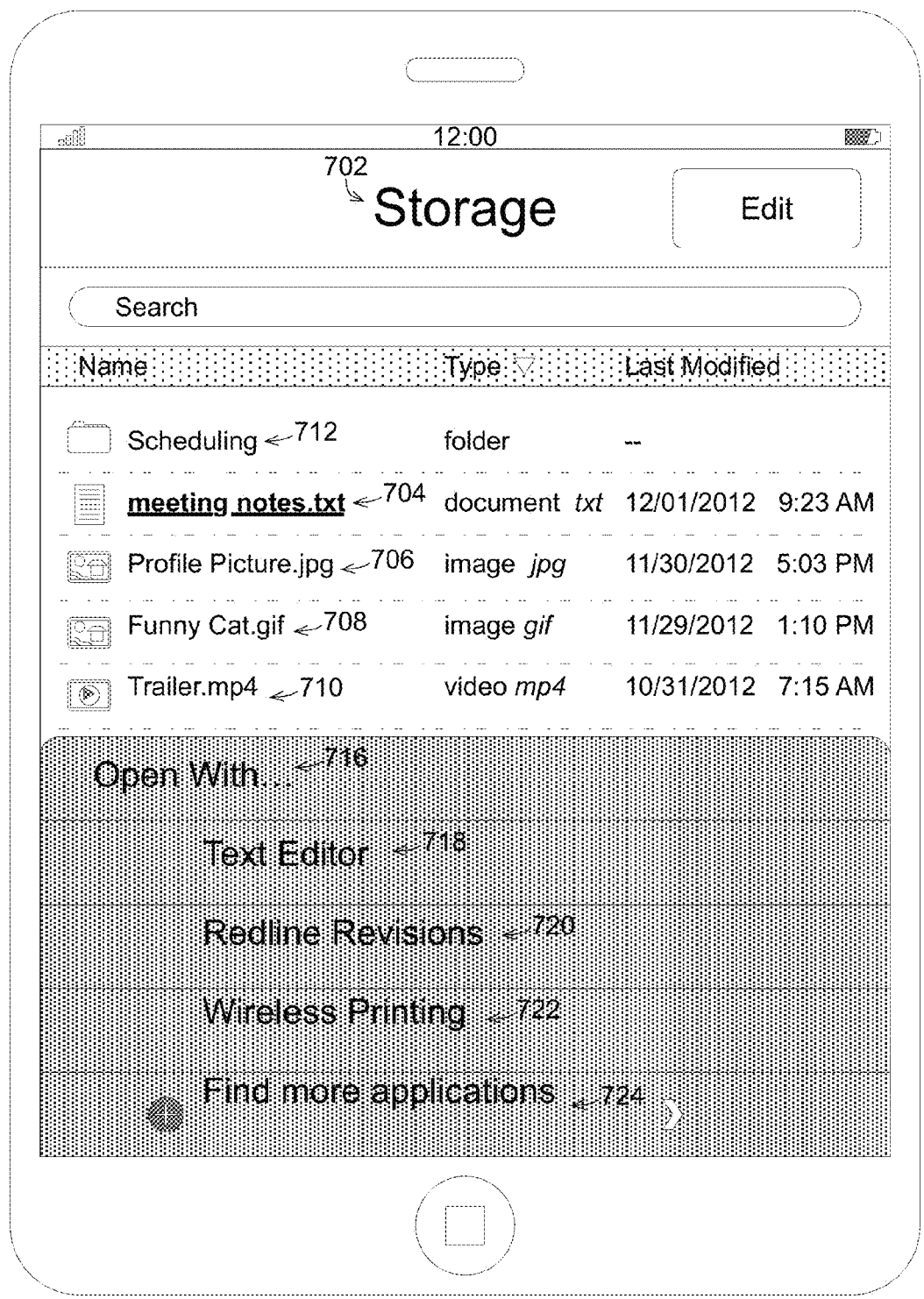
FIG. 7B shows a screenshot of an exemplary device embodiment for accessing files stored in a networked environment.

FIG. 7B shows a screenshot of an exemplary device embodiment for accessing files stored in a content management system. The user has chosen the button for Open With 716 such that more options are provided for accessing meeting notes.txt 704. FIG. 7B shows applications that are capable of accessing meeting notes.txt 704 and that are already installed on the exemplary computing device embodiment. The applications already on the computing device and already configured for accessing meeting notes.txt 704 can include, for example, Text Editor app 718, Redline Revisions app 720, and Wireless Printing app 722. The user can choose to access meeting notes.txt 704 using these applications that are already on the computing device.

In addition, the computing device can also enable more applications (e.g., that are not yet installed on the device) to be recommended for the user. The user can choose to find more applications (e.g. applications that are related to and/or capable of processing meeting notes.txt 704). As discussed above, the computing device can assume that meeting notes.txt 704 (and/or its document file type) is most relevant to the user and thus select meeting notes.txt 704 (and/or its document file type). Then, the computing device can identify applications suitable for meeting notes.txt 704 (and/or its document file type) based on comparing the information associated with meeting notes.txt 704 and information associated with applications in order to find similarity, relatedness, relevancy, and/or compatibility. When the user chooses Find more applications 724, the recommended applications can be present to the user, as shown in FIG. 7C.

Figure 7C:
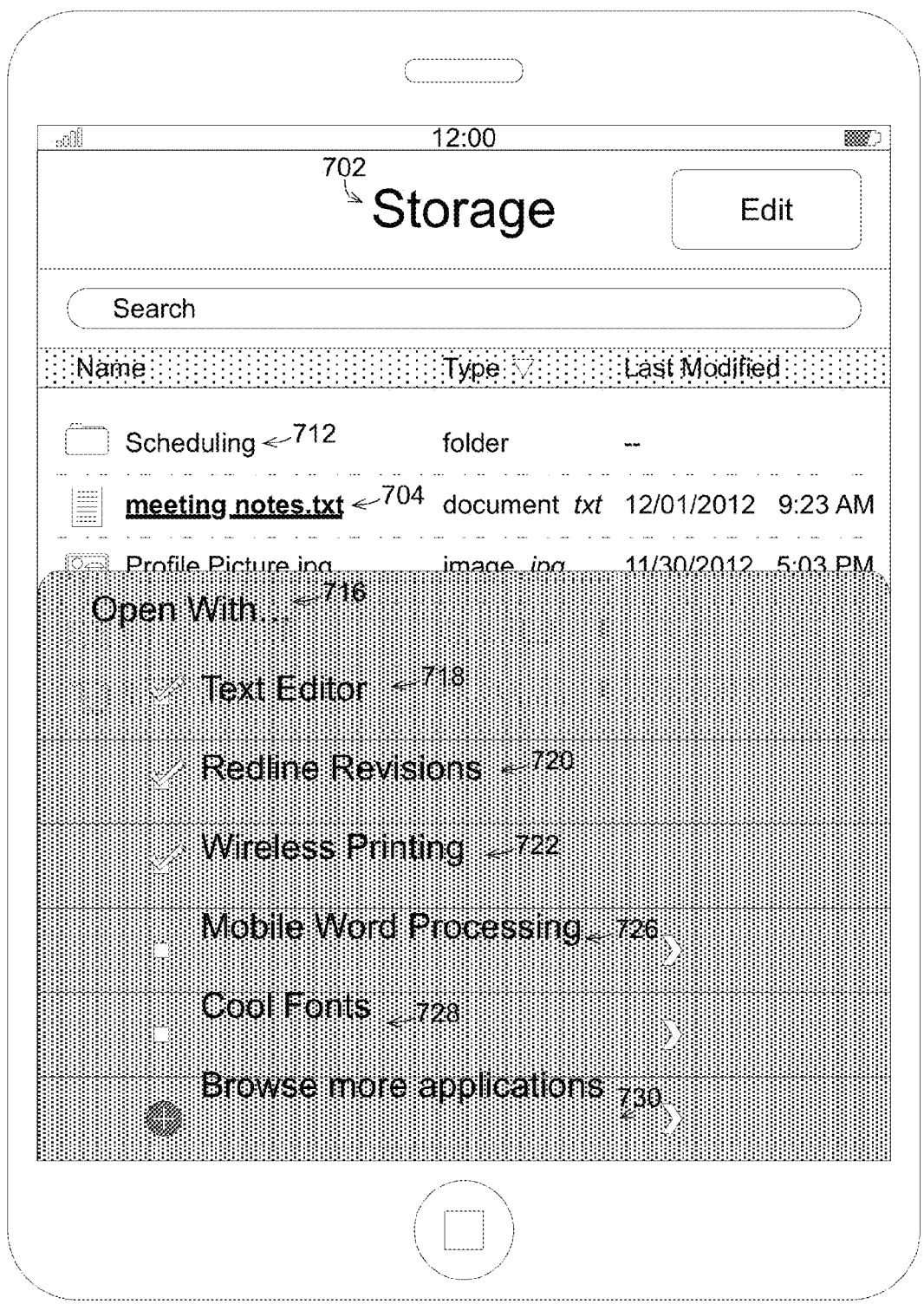
FIG. 7C shows a screenshot of an exemplary device embodiment for providing access to applications recommended using files stored in a networked environment.

The screenshot of FIG. 7C shows applications that are not already installed on the device and that are recommended for the user to use with respect to meeting notes.txt 704. The recommended applications can include, for example, Mobile Word Processing app 726 and Cool Fonts app 728.

In some embodiments, the exemplary computing device embodiment can also provide an input area (e.g., button Browse more applications 730) that, when enabled/triggered by the user, can present and/or provide access to more recommended applications.

In some embodiments, when the user interacts with (e.g., taps on) a recommended app, a download, installation, and/or execution of the recommended can be initiated. In some embodiments, when the user interacts with (e.g., taps on) a recommended app, an interface (e.g., application marketplace) for downloading, installing, and/or executing the recommended app can be provided to the user such that the user can download, install, and/or execute the recommended app via the interface.

Figure 8:
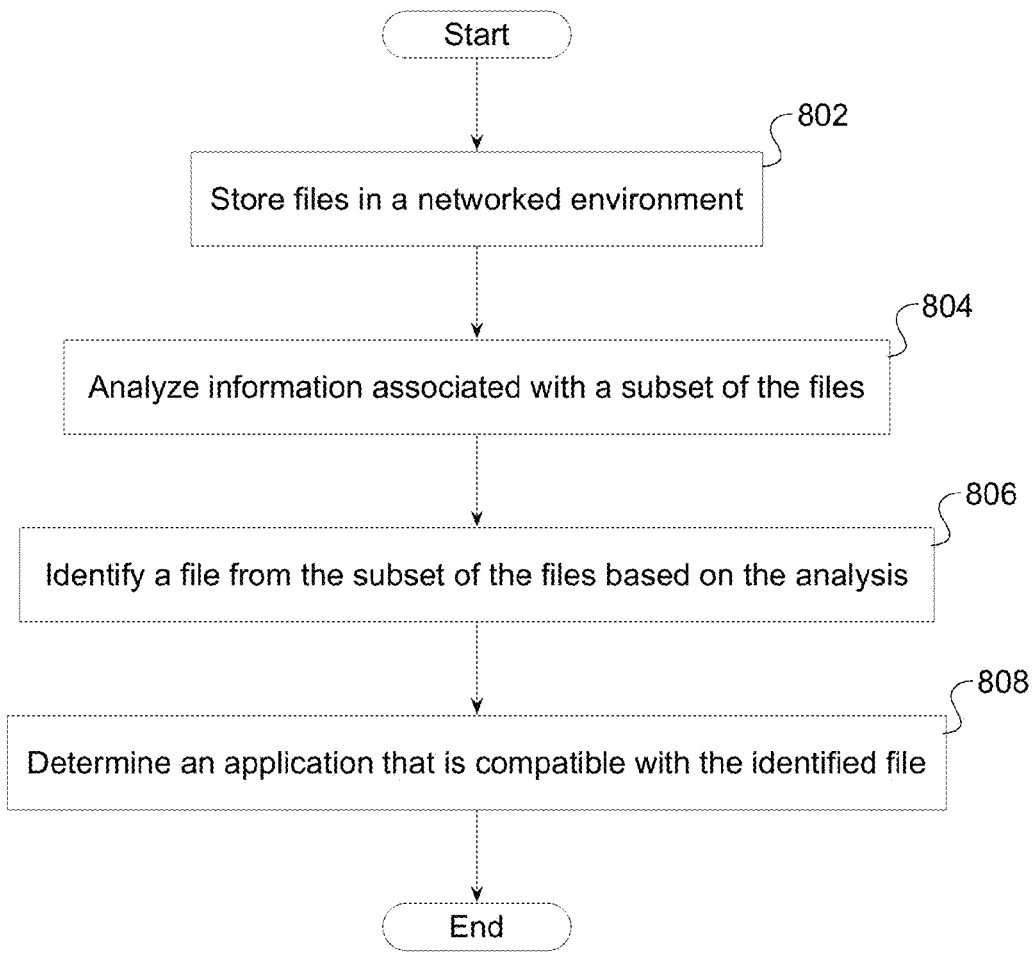
FIG. 8 shows an exemplary method embodiment for application recommendation using stored files.

FIG. 8 shows an exemplary method embodiment for application recommendation using stored files. It should be understood that there can be additional, fewer, or alternative steps performed in similar or alternative orders, or in parallel, within the scope of the various embodiments unless otherwise stated. The exemplary method embodiment can begin with storing a plurality of files in a content management system at step 802. The plurality of files can be associated with a user account of the content management system. For example, the user can have an account with the content management system and the files can be uploaded by the user into his/her account with the content management system. In some cases, one or more files can be associated with the user in that the one or more files can be shared with the user by another user.

At step 804, information associated with a subset of the plurality of files is analyzed. The subset can be either an equal subset (in which all files in the plurality are in the subset) or a proper/strict subset (in which the plurality has more files than the subset). In some embodiments, the information can include at least one of a file type associated with each file in the subset, a number of times that each file in the subset has been accessed, a time at which each file in the subset was most recently accessed, or content included in each file in the subset. Accessing a file can include (but is not limited to) uploading, saving, modifying, updating, viewing, previewing, opening, and/or executing the file.

Step 806 can include identifying at least one file from the subset of the plurality of files. The identifying of the at least one file can be based at least in part on the analysis of the information in step 806. At step 808, a set of applications is identified that are compatible with the identified at least one file. In some embodiments, a set of applications is identified that are compatible with at least one property associated with the identified at least one file. For example, the system can identify one application (e.g., image editing app) that is compatible with a file type (e.g., image file type) associated with a file (e.g., image file) identified based on the analysis of the information in step 806.

Figure 9:
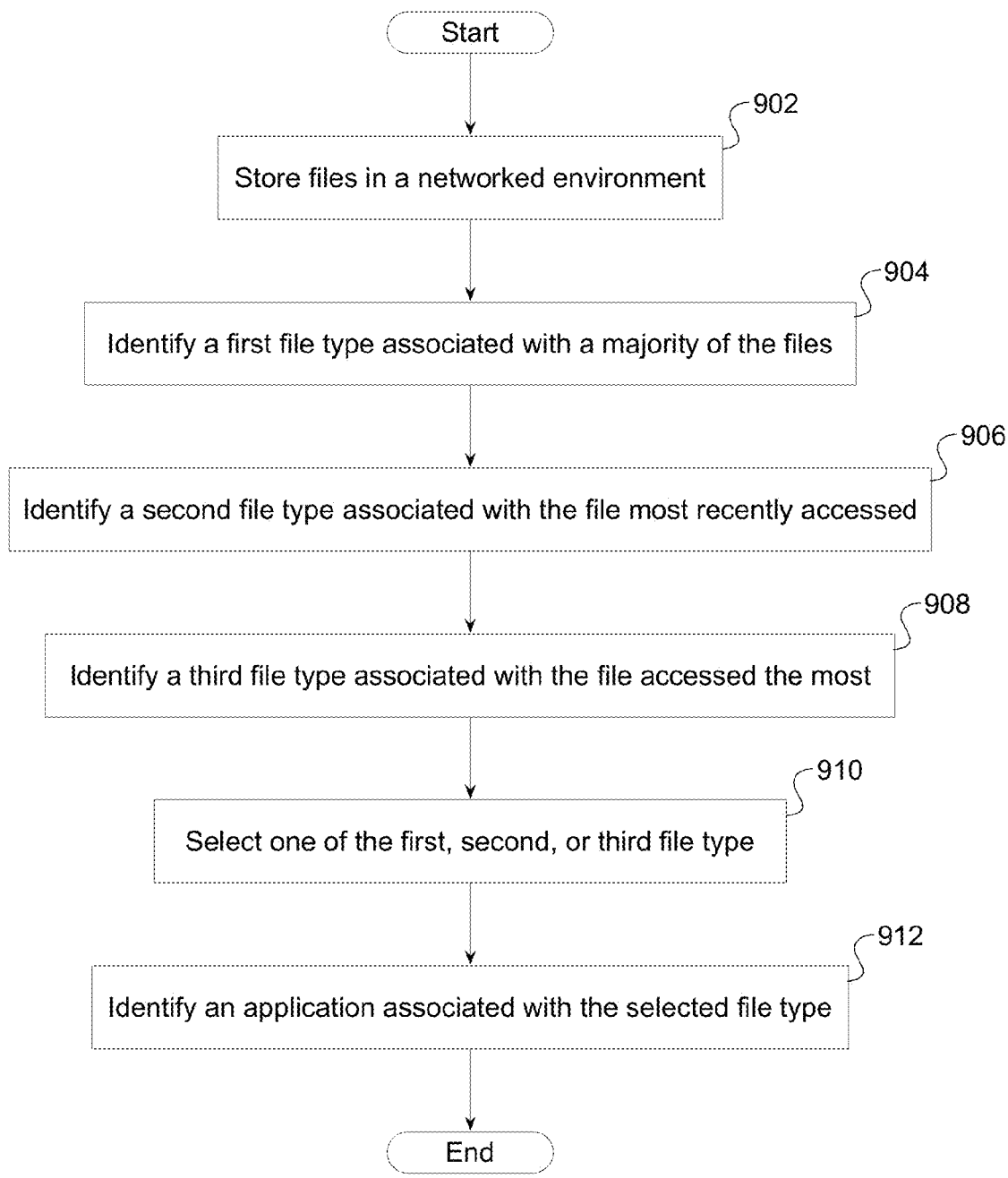
FIG. 9 shows an exemplary method embodiment for application recommendation using stored files.

FIG. 9 shows an exemplary method embodiment for application recommendation using stored files. Again, it should be understood that there can be additional, fewer, or alternative steps performed in similar or alternative orders, or in parallel, within the scope of the various embodiments unless otherwise stated. At step 902, a plurality of files is stored in a content management system. For example, the content management system can provide one or more servers communicatively connected via a network. The files can be stored using the one or more servers.

A first file type can be identified that is associated with a majority of files in the plurality of files, at step 904. For example, if there were 10 files in the plurality of files, fours files being of an image file type, three files being of a spreadsheet document type, and three files being of an audio file type, then the first file type would be the image file type. The system can also identify a second file type associated with at least one file that was most recently accessed, at step 906. For example, the system can identify the file that was last accessed (e.g., most recently accessed by the user) and the second file type would be the file type of the file that was last accessed. Step 908 can include identifying a third file type associated with at least one file that has a largest number of times being accessed. For example, if a text document file was accessed by the user 10 times while other files have been accessed less than 10 times, then the third file type would be a text document file type.

At step 910, the system can select at least one of the first file type, the second file type, or the third file type. In some embodiments, the selection can be based on implemented configuration settings (e.g., settings implemented by the content management system). Then at step 912, the system can identify one or more applications associated with the at least one selected file type. In some embodiments, the at least one application can be identified from a plurality of applications in an application library. For example, the system can identify one or more applications associated with a selected image file type. The one or more identified applications can be one or more image editing applications included in an application marketplace.

In some embodiments, recommending an application for a file can be based on analyzing the contents of the file. For example, if a text document file has a significant number of misspellings, then a spell checker application can be recommended for the text document file. In another example, if slideshow presentation file has a significant number of references to dates, then a calendar application can be recommended. In a further example, if an image file is analyzed and the image file is determined to show a person with red-eyes due to camera flash, then a red-eye reduction/removal application can be recommended.

In some embodiments, a relevancy level (relative to the user) can be assessed for each file (or each file type) stored in the networked environment at the user's account. The relevancy level for each file can indicate a likelihood that the file will be relevant to the user. A file with a high relevancy level can have a high likelihood of being relevant to the user. In some embodiments, the relevancy level can be a score calculated for each file based on the information associated with a respective file.

In some embodiments, a file stored on the networked environment at the user's account can be a file that is shared with the user by another user. The information associated with the file can include identifying information for a set of applications used by the other user to access the file. In some embodiments, determining which applications to recommend to the user can be based on the identifying information for the set of applications used by the other user.

In some embodiments, advertisements can also be recommended using files stored in the networked environment (including using information about the files stored in the networked environment). For example, if a video file is selected/identified as being likely to be most relevant to the user, then advertisements relating to videos can be recommended to the user. If the video file is a trailer for a movie, then ads can be recommended for renting the movie, purchasing the movie, and/or purchasing movie theater tickets for the movie. In another example, if an audio file associated with a musical artist is selected/identified as being probably most relevant to the user, then ads related to the musical artist's music and/or tickets to the artist's concert can be recommended and presented to the user.

Figure 10A:
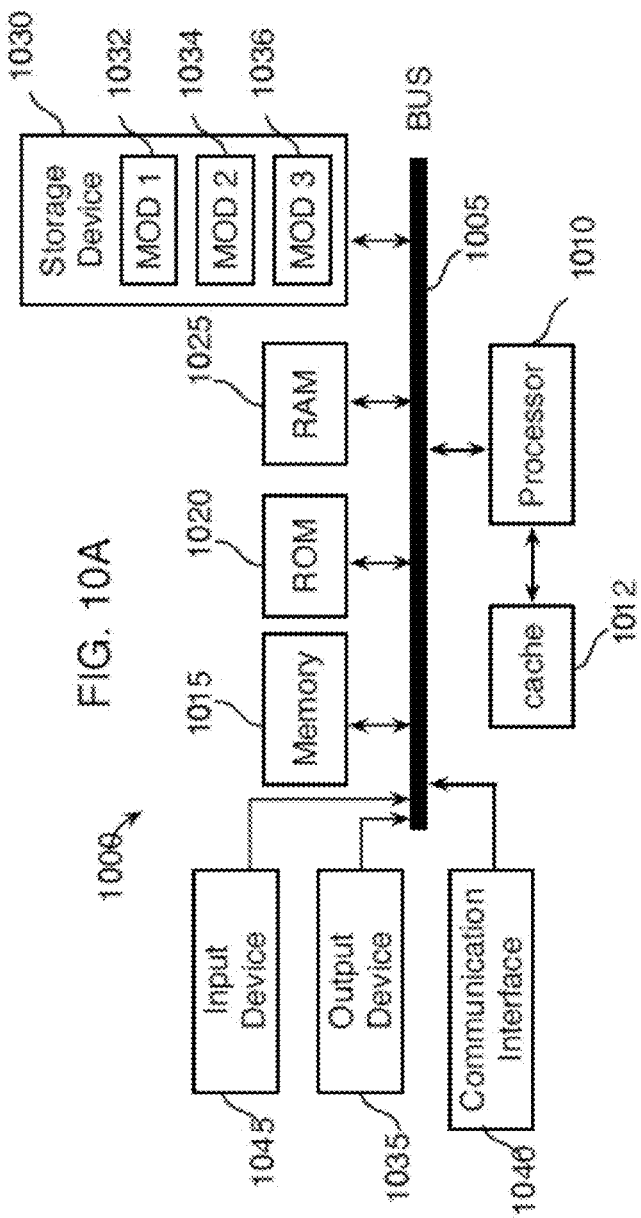
FIG. 10A shows an exemplary possible system embodiment for application recommendation using stored files.
Figure 10B:
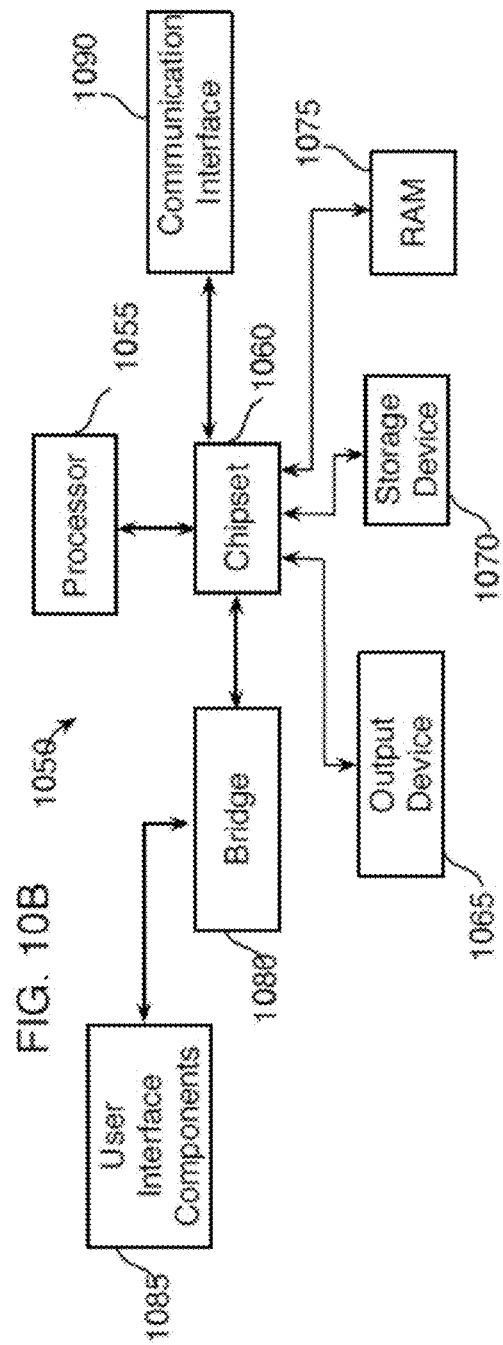
FIG. 10B shows an exemplary possible system embodiment for application recommendation using stored files.

FIG. 10A and FIG. 10B show exemplary implementations for a system in accordance with the present technology. The more appropriate embodiment will be apparent to those of ordinary skill in the art when practicing the present technology. Persons of ordinary skill in the art will also readily appreciate that other system embodiments are possible.

FIG. 10A illustrates a conventional system bus computing system architecture 1000 wherein the components of the system are in electrical communication with each other using a bus 1005. Exemplary system 1000 includes a processing unit (CPU or processor) 1010 and a system bus 1005 that couples various system components including the system memory 1015, such as read only memory (ROM) 1020 and random access memory (RAM) 1025, to the processor 1010. The system 1000 can include a cache of high-speed memory connected directly with, in close proximity to, or integrated as part of the processor 1010. The system 1000 can copy data from the memory 1015 and/or the storage device 1030 to the cache 1012 for quick access by the processor 1010. In this way, the cache can provide a performance boost that avoids processor 1010 delays while waiting for data. These and other modules can control or be configured to control the processor 1010 to perform various actions. Other system memory 1015 may be available for use as well. The memory 1015 can include multiple different types of memory with different performance characteristics. The processor 1010 can include any general purpose processor and a hardware module or software module, such as module 1 1032, module 2 1034, and module 3 1036 stored in storage device 1030, configured to control the processor 1010 as well as a special-purpose processor where software instructions are incorporated into the actual processor design. The processor 1010 may essentially be a completely self-contained computing system, containing multiple cores or processors, a bus, memory controller, cache, etc. A multi-core processor may be symmetric or asymmetric.

To enable user interaction with the computing device 1000, an input device 1045 can represent any number of input mechanisms, such as a microphone for speech, a touch-sensitive screen for gesture or graphical input, keyboard, mouse, motion input, speech and so forth. An output device 1035 can also be one or more of a number of output mechanisms known to those of skill in the art. In some instances, multimodal systems can enable a user to provide multiple types of input to communicate with the computing device 1000. The communications interface 1040 can generally govern and manage the user input and system output. There is no restriction on operating on any particular hardware arrangement and therefore the basic features here may easily be substituted for improved hardware or firmware arrangements as they are developed.

Storage device 1030 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1025, read only memory (ROM) 1020, and hybrids thereof.

The storage device 1030 can include software modules 1032, 1034, 1036 for controlling the processor 1010. Other hardware or software modules are contemplated. The storage device 1030 can be connected to the system bus 1005. In one aspect, a hardware module that performs a particular function can include the software component stored in a computer-readable medium in connection with the necessary hardware components, such as the processor 1010, bus 1005, display 1035, and so forth, to carry out the function.

FIG. 10B illustrates a computer system 1050 having a chipset architecture that can be used in executing the described method and generating and displaying a graphical user interface (GUI). Computer system 1050 is an example of computer hardware, software, and firmware that can be used to implement the disclosed technology. System 1050 can include a processor 1055, representative of any number of physically and/or logically distinct resources capable of executing software, firmware, and hardware configured to perform identified computations. Processor 1055 can communicate with a chipset 1060 that can control input to and output from processor 1055. In this example, chipset 1060 outputs information to output 1065, such as a display, and can read and write information to storage device 1070, which can include magnetic media, and solid state media, for example. Chipset 1060 can also read data from and write data to RAM 1075. A bridge 1080 for interfacing with a variety of user interface components 1085 can be provided for interfacing with chipset 1060. Such user interface components 1085 can include a keyboard, a microphone, touch detection and processing circuitry, a pointing device, such as a mouse, and so on. In general, inputs to system 1050 can come from any of a variety of sources, machine generated and/or human generated.

Chipset 1060 can also interface with one or more communication interfaces 1090 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 1055 analyzing data stored in storage 1070 or 1075. Further, the machine can receive inputs from a user via user interface components 1085 and execute appropriate functions, such as browsing functions by interpreting these inputs using processor 1055.

It can be appreciated that exemplary systems 1000 and 1050 can have more than one processor 1010 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method comprising:
   receiving, by a processor, a request to upload a plurality of files to a user account of a network content management system wherein the system can be synced with any computing device that is logged into the user account;
   storing, by a processor, the plurality of files in the system, the plurality of files being stored at the user account of the system, wherein one or more modifications or updates to the plurality of files are synchronized at the user account of the system, wherein a user can manipulate content directly in a local folder, while a background process monitors the local folder for changes, synchronizes those changes to the system, and provides notifications of synchronization operations and indications of content statuses;
   analyzing, by a processor, at least a portion of information associated with at least a subset of the plurality of files, the information including a file type associated with each file in the subset, a number of times that each file in the subset has been accessed, a time at which each file in the subset was most recently accessed, usage history data related to use of the subset of the plurality of files by the user account, and content included in each file in the subset, wherein the subset is either: (1) an equal subset wherein each file in the plurality of files is in the subset or (2) a strict subset wherein the plurality of files includes at least one file in addition to the files in the subset, and wherein the subset includes files that have been accessed by the user account within a specified time period;
   identifying, by a processor, at least one file, from the subset of the plurality of files, that has at least a threshold level of being relevant with respect to the user account, the identification of the at least one file being based on the analysis of the information;
   identifying, via a processor, a first file type associated with a majority of the files, a second file type associated with a file most recently accessed, a third file type associated with a file accessed the most, and selecting one of the first, second, or third file type;
   determining, by a processor, at least one application compatible with the selected file type associated with the identified at least one file; and recommending, by a processor, the determined at least one application to the user account from an applicant library that is associated with an application marketplace.

2. The computer implemented method of claim 1, wherein the identifying the at least one file comprises identifying at least one file that satisfies a set of identification criterion, the set of identification criteria being configured to take into account at least a portion of the information associated with the at least the subset of the plurality of files.

3. The computer implemented method of claim 2, wherein the at least one file satisfies the set of identification criterion when the at least one file is at least one of a file that has been most recently accessed by the user account, a file having a file type that is most common among the subset, or a file that has a largest number of times being accessed by the user account.

4. The computer implemented method of claim 1, wherein the determining the at least one application comprises determining a set of applications capable of processing the selected file type.

5. The computer implemented method of claim 4, wherein the set of applications is capable of modifying at least a portion of content included in the identified at least one file.

6. The computer implemented method of claim 1, wherein the at least one file is shared with the user account by at least one other user account, wherein the information includes identification of a set of applications used by the at least one other user account to access the at least one file, and wherein the determining the at least one application is based at least in part on the identification of the set of applications used by the at least one other user account.

7. The computer implemented method of claim 1, further comprising:
determining, by a processor, a set of advertising associated with the selected file type.

8. A non-transitory computer-readable medium storing processor-executable instructions for causing a processor to:
receive a request to upload a plurality of files to a user account of a network content management system wherein the system can be synced with any computing device that is logged into the user account;
store the plurality of files in the system, the plurality of files being stored at the user account of the system, wherein one or more modifications or updates to the plurality of files are synchronized at the user account of the system, wherein a user can manipulate content directly in a local folder, while a background process monitors the local folder for changes, synchronizes those changes to the system, and provides notifications of synchronization operations and indications of content statuses;
identify at least a portion of information associated with at least a subset of a plurality of files stored in an account of content management system associated with a user account, the information including a file type associated with each file in the subset, a number of times that each file in the subset has been accessed, a time at which each file in the subset was most recently accessed, usage history data related to use of the subset of the plurality of files by the user account, and content included in each file in the subset, wherein the subset is either: (1) an equal subset wherein each file in the plurality of files is in the subset or (2) a strict subset wherein the plurality of files includes at least one file in addition to the files in the subset, and wherein the subset includes files that have been accessed by the user account within a specified time period;
identify at least one file, from the subset of the plurality of files, that has at least a threshold level of being relevant with respect to the user account, the identification of the at least one file being based on the analysis of the information;
identify a first file type associated with a majority of the files, a second file type associated with a file most recently accessed, a third file type associated with a file accessed the most, and selecting one of the first, second, or third file type;
determine at least one application compatible with the selected file type associated with the identified at least one file; and
recommend the determined at least one application to the user account from an applicant library that is associated with an application marketplace.

9. The non-transitory computer-readable medium of claim 8, further storing instructions for causing a processor to:
display the at least one application in a user interface in response to a user interaction with respect to one or more files associated with the identified file.

10. The non-transitory computer-readable medium of claim 8, further storing instructions for causing a processor to:
identify a file type associated with a majority of files in a subset of the plurality of files, and select a property of that file type for determining at least one application to recommend to the user account.

11. The non-transitory computer-readable medium of claim 8, further storing instructions for causing a processor to:
identify a file type associated with at least one file that has a largest number of times being accessed, and select a property of that type for determining at least one application to recommend to the user account.

12. A system comprising:
a processor; and
a computer readable medium storing processor-executable instructions for causing the processor to:
receive a request to upload a plurality of files to a user account of a network content management system wherein the system can be synced with any computing device that is logged into the user account;
store the plurality of files in the system, the plurality of files being stored at the user account of the system, wherein one or more modifications or updates to the plurality of files are synchronized at the user account of the system, wherein a user can manipulate content directly in a local folder, while a background process monitors the local folder for changes, synchronizes those changes to the system, and provides notifications of synchronization operations and indications of content statuses;
identify at least a portion of information associated with at least a subset of a plurality of files stored in an account of content management system associated with a user, the information a file type associated with each file in the subset, a number of times that each file in the subset has been accessed, a time at which each file in the subset was most recently accessed, usage history data related to use of the subset of the plurality of files by the user account, and content included in each file in the subset, wherein the subset is either: (1) an equal subset wherein each file in the plurality of files is in the subset or (2) a strict subset wherein the plurality of files includes at least one file in addition to the files in the subset, and wherein the subset includes files that have been accessed by the user account within a specified time period;
identify at least one file, from the subset of the plurality of files, that has at least a threshold level of being relevant with respect to the user account, the identification of the at least one file being based on the analysis of the information;

identify a first file type associated with a majority of the files, a second file type associated with a file most recently accessed, a third file type associated with a file accessed the most, and selecting one of the first, second, or third file type;

determine at least one application compatible with the selected file type associated with the identified at least one file; and recommend the determined at least one application to the user from an applicant library that is associated with an application marketplace.

13. The system of claim 12, wherein the determined at least one application is a subset of a plurality of applications in the application library.

14. The system of claim 13, wherein the application library is configured to communicate with the networked environment to provide access to the determined at least one application.

15. The system of claim 13, wherein the application library resides at least in part with the system.

16. The system of claim 13, wherein the computer readable medium further storing processor-executable instructions for causing the processor to further provide access to the determined at least one application, by providing a link via a user interface for accessing the determined at least one application or providing the application marketplace that loads the determined at least one application.

17. The system of claim 12, wherein the determining comprises comparing at least one property associated with the identified at least one file, with a database correlating file properties with applications acquired using other user accounts.

* * * * *